US006961848B2

(12) United States Patent
Fish et al.

(10) Patent No.: US 6,961,848 B2
(45) Date of Patent: Nov. 1, 2005

(54) SYSTEM AND METHOD FOR SUPPORTING LEGACY OPERATING SYSTEM BOOTING IN A LEGACY-FREE SYSTEM

(75) Inventors: Andrew J. Fish, Olympia, WA (US); Michael D. Kinney, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 607 days.

(21) Appl. No.: 10/016,055

(22) Filed: Dec. 11, 2001

(65) Prior Publication Data

US 2003/0110370 A1 Jun. 12, 2003

(51) Int. Cl.[7] .............................. G06F 9/00; G06F 9/24; G06F 9/445
(52) U.S. Cl. ........................................................ 713/2
(58) Field of Search ............................................. 713/2

(56) References Cited

U.S. PATENT DOCUMENTS 5,999,989 A * 12/1999 Patel ............................. 710/1
6,081,890 A   6/2000 Datta

OTHER PUBLICATIONS

White Paper, Legacy Technology Transitions, Dell Computer, Jun. 2001.*
"BIOS Basics," BIOS CENTRAL, http://www.bioscentral.com/misc/biosbasics.htm, Mar. 4, 2002.

Mark Doran—Intel Corporation, "Extensible Firmware Interface—Changing the face of BIOS," Aug. 28–30, 2001, Intel Developer Forum, Fall 2001.

Sverre Jarp, "IA–64 architecture—A Detailed Tutorial," Version 3 http://nicewww.cern.ch/~sverre/SJ.html, Nov. 8, 2001.

Sunil Saxena, "IA–64 Architecture," Intel Corporation, Sep. 11, 2000.

Intel, "Extensible Firmware Interface Specification," Version 1.02, Dec. 12, 2000.

* cited by examiner

Primary Examiner—Lynne H. Browne
Assistant Examiner—Matthew A. Henry
(74) Attorney, Agent, or Firm—Joni D. Stutman-Horn

(57) ABSTRACT

An alternative boot methodology that begins with legacy-free firmware allows the peaceful coexistence of legacy-free and legacy option ROMs in a system. Legacy-free firmware provides a legacy-free boot path from system power up to operating system loading. This legacy-free boot path is independent of any legacy firmware. A legacy-free boot manager boots from an ordered list of OS loaders. If a legacy boot option is available, legacy-free drivers that have already been loaded may be stopped, and a legacy boot using legacy firmware may be initiated, without having to reboot the system.

18 Claims, 3 Drawing Sheets

SYSTEM AND METHOD FOR SUPPORTING LEGACY OPERATING SYSTEM BOOTING IN A LEGACY-FREE SYSTEM

REFERENCE TO COMPUTER PROGRAM LISTING APPENDIX

The present application is supplemented by a technical appendix submitted on compact disc in a file entitled "Intel$_{13}$ ExtensibleFirmwareInterface_Spec_V–1.02.txt" (created Dec. 11, 2001 and being 759,615 bytes in size (786,432 bytes used)), and this technical appendix is hereby incorporated by reference in its entirety.

BACKGROUND

The present application relates to firmware and in particular describes systems and techniques relating to supporting legacy operating system booting in a legacy-free system.

Traditional firmware is machine instructions stored in non-volatile memory, which is typically read only memory (ROM) or flash memory. Thus, traditional firmware is a combination of software and hardware, although the term "firmware" is also used to refer to the software itself that is written with the intention of storing it in non-volatile memory. For example, on the Intel Architecture for Personal Computers (IA-PC), system firmware is commonly referred to as the BIOS (Basic Input/Output System), which is software alone.

A typical use for firmware is to provide machine instructions that control a data processing system when it is powered up from a shut down state, before volatile memory has been tested and configured. Firmware is also commonly used to reinitialize or reconfigure a data processing system after defined hardware events and/or to handle certain system level events like system interrupts.

The process of bringing a data processing system to its operating state from a powered down state is commonly known as bootstrapping, booting up, or the boot process. Bootstrapping typically begins with one or more processors in a data processing system. Each processor tests its internal components and interfaces. After the initial processor testing, initialization of system level resources commences. In multiprocessor systems, a single bootstrap processor (BSP) may be selected to handle initializing remaining processors and to handle the system level initialization. System level initialization typically includes procedures for checking memory integrity, identifying and initializing other resources in the data processing system, and loading an operating system (OS) into memory.

Loading an OS typically begins with loading a first stage OS loader from a specified location on a boot media. This first stage OS loader can then use basic hardware abstractions provided by the system firmware to load a more complex second stage OS loader. This process is continued until the OS is loaded and takes complete control of the data processing system.

The boot process is governed by an interface between the OS and the firmware, and firmware is typically closely tied to the processor architecture of the system for which the firmware is designed. Traditionally, the underlying processor architecture has been reflected in system level resources, which are initiated, configured and services by the firmware. A large number of resources (e.g., mass storage media controllers, peripheral devices) have been designed under this traditional paradigm and are thus dependent upon a legacy boot process. Because of these sunk costs, it may be desirable to have new legacy-free computing environments support such legacy boot processes.

DRAWING DESCRIPTIONS

Figure 1:
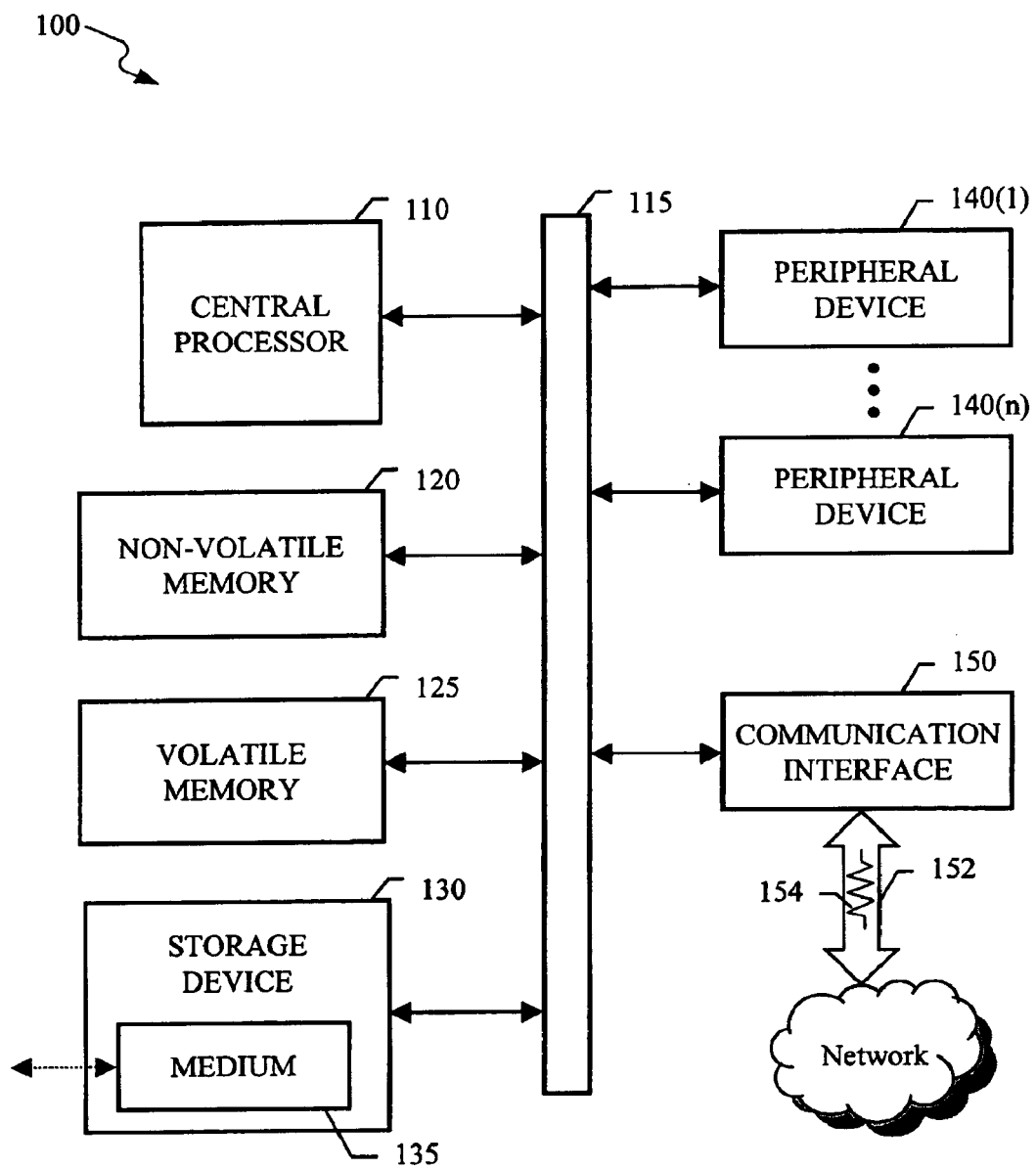
FIG. 1 is a block diagram illustrating an example data processing system in which legacy operating system booting may be supported in a legacy-free environment.

Details of one or more embodiments are set forth in the accompanying drawings and the description below. Other features and advantages may be apparent from the description and drawings, and from the claims.

DETAILED DESCRIPTION

The systems and techniques described here relate to firmware and to supporting legacy operating system booting in a legacy-free environment in a data processing system/ machine. As used herein, the term "firmware" means machine instructions for initializing at least a portion of a data processing system upon power up. The term "platform" means hardware and firmware together on a data processing system. The term "platform firmware" means firmware that resides in a data processing system before power up (i.e., excluding firmware extensions). The term "system firmware" means firmware that resides in a data processing system after it has booted up and an operating system has been loaded (i.e., including firmware extensions).

The term "legacy" means using an application program interface (API) in which software that uses firmware routines is dependent upon firmware implementation detail. Thus, legacy firmware includes the 16-bit BIOS used in many existing personal computers (PCs) and associated peripheral devices. The term "legacy-free" means using an API in which software that uses firmware routines is not dependent upon firmware implementation detail. Thus, legacy-free firmware includes Extensible Firmware Interface firmware, which uses a formal and complete abstract specification of the software-visible interface presented to the OS by the firmware.

An alternative boot methodology that begins with legacy-free firmware allows the peaceful coexistence of legacy-free and legacy option ROMs in a system. Legacy-free firmware provides a legacy-free boot path from system power up to operating system loading. This legacy-free boot path is independent of any legacy firmware. Thus, unlike a first generation Extensible Firmware Interface (EFI) system, this legacy-free booting does not use any legacy BIOS.

A legacy-free boot manager boots from an ordered list of OS loaders. The OS boot order may be a configuration option for the legacy-free boot manager. If a legacy boot option is available, legacy-free drivers that have already been loaded may be stopped, and a legacy boot using legacy firmware may be initiated, without having to reboot the system.

Thus, legacy firmware is supported without intermixing a legacy boot path with a legacy-free boot path. Such intermixing can make future elimination of the legacy environment more difficult. For example, in the case of EFI, the next generation of EFI defines an EFI option ROM standard that is intended to replace legacy option ROMs, which may present a problem for a system that supports booting both legacy operating systems and EFI operating systems.

By separating the legacy-free boot path from the legacy boot path, a legacy OS boot is supported in a legacy-free system, but the legacy OS boot may be phased out over time. The legacy firmware and the legacy-free drivers are not connected, thus they can evolve independently of each other. The legacy option ROMs are either part of a plug-in device or part of a legacy platform.

In contrast, other implementations (e.g., Kitty Hawk) have used a hybrid model, where part of an option ROM is written in C and the rest is written as a legacy option ROM. These types of implementations require a complex hand-off state to be passed between two separate drivers that are difficult to maintain.

By encapsulating legacy firmware and legacy option ROMs in a legacy boot path that is separate from a legacy-free boot path, a legacy environment and the legacy-free environment are bound together such that they do not conflict with each other, while the inherent limitations of the legacy environment are contained in the legacy boot path and may be phased out over time.

FIG. 1 is a block diagram illustrating an example data processing system 100 in which legacy operating system booting may be supported in a legacy-free environment. The data processing system 100 includes a central processor 110, which executes programs, performs data manipulations and controls tasks in the system 100. The central processor 110 may include multiple processors or processing units and may be housed in a single chip (e.g., a microprocessor or microcontroller) or in multiple chips using one or more printed circuit boards or alternative inter-processor communication links (i.e., two or more discrete processors making up a multiple processor system). Examples of the processors and/or processing units that may be part of the central processor 110 include an arithmetic logic unit (ALU) to perform arithmetic and logic operations, a control unit to obtain and execute instructions, an auxiliary processor, a back-end processor, a digital signal processor, or a coprocessor.

The central processor 110 is coupled with a communication bus 115. The communication bus 115 provides one or more pathways through which data is transmitted among components of the system 100. The communication bus 115 may include multiple separate busses, each having an address bus and a data bus. For example, in a personal computer, the communication bus 115 represents an internal bus to connect internal components to the central processor 110 and memory, and an expansion bus to connect expansion boards and/or peripheral devices to the central processor 110. The communication bus 115 may include any known bus architecture (e.g., peripheral component interconnect (PCI), industry standard architecture (ISA), extended ISA (EISA)).

The data processing system 100 includes a non-volatile memory 120 and a volatile memory 125, which are both coupled with the communications bus 115. The system 100 may also include one or more cache memories. These memory devices enable storage of instructions and data close to the central processor 110 for retrieval and execution.

The non-volatile memory 120 contains platform firmware (e.g., BIOS) to handle initialization of the data processing system 100 and loading of an operating system (OS) when starting up. Examples of the non-volatile memory 120 include non-volatile random access memory (NVRAM), ferroelectric random access memory (e.g., FRAM™), ferromagnetic random access memory (FM-RAM), read only memory (ROM), programmable read-only memory (PROM), erasable programmable read-only memory (EPROM), electrically erasable read-only memory (EEPROM), flash memory (block oriented memory similar to EEPROM), and the like.

The volatile memory, which requires a steady flow of electricity to maintain stored data, may be used to store instructions and data once the system 100 starts up. Examples of the volatile memory 125 include dynamic random access memory (DRAM), static random access memory (SRAM), synchronous dynamic random access memory (SDRAM), and Rambus® dynamic random access memory (RDRAM)

The data processing system 100 may include a storage device 130 for accessing a medium 135 (e.g., a boot media), which may be removable. The boot media may be a machine-readable medium that contains instructions and data (i.e., OS data) that are loaded into the volatile memory 125 when the system 100 boots up. The medium 135 may be read-only or read/write media and may be magnetic based or optical based media. Examples of the storage 130 and the medium 135 include a hard disk drive and hard disk platters, which may be removable, a floppy disk drive and floppy disk, a tape drive and tape, and an optical disc drive and optical disc (e.g., laser disk, compact disc (CD), digital versatile disk (DVD)).

The data processing system 100 may also include one or more peripheral devices 140(1)–140(n) (collectively, devices 140), and one or more controllers and/or adapters for providing interface functions. The devices 140 may be additional storage devices and media as described above, other storage interfaces and storage units, input devices or output devices. For example, the system 100 may include a display system having a display device (e.g., a video display adapter having components for driving a display (e.g., an LCD (liquid crystal display) or CRT (cathode ray tube) monitor), including video random access memory (VRAM), buffer, and graphics engine).

Additionally, the system 100 may include a serial port, parallel port, infrared port, universal asynchronous receiver-transmitter (UART) port, a PCMCIA (Personal Computer Memory Card International Association) slot, or printer adapter, for interfacing between various I/O devices such as a mouse, joystick, keyboard, trackball, trackpad, trackstick, PCMCIA card, printer, bar code reader, charge-coupled device (CCD) reader, scanner, video capture device, touch screen, stylus, transducer, microphone, speaker, etc.

The system 100 may further include a communication interface 150, which allows software and data to be transferred, in the form of signals 154, between the system 100 and external devices, networks or information sources. The signals 154 may be any signals (e.g., electronic, electromagnetic, optical) capable of being received via a channel 152 (e.g., wire, cable, optical fiber, phone line, infrared (IR) channel, radio frequency (RF) channel, etc.). The signals 154 may embody instructions for causing the system 100 to perform operations. For example, the signals 154 may embody instructions and data (representing a boot media (i.e., OS data)) that are loaded into the volatile memory 125 when the system 100 boots up, and that cause the system 100 to perform operations that support additional software applications on the system 100.

The communication interface 150 may be a communications port, a telephone modem or wireless modem. The communication interface 150 may be a network interface card (e.g., an Ethernet card) designed for a particular type of network, protocol and channel medium, or may be designed to serve multiple networks, protocols and/or channel media.

When viewed as a whole, the system 100 is a programmable machine. Example machines represented by the system 100 include a personal computer, a mobile system (e.g., a laptop or a personal digital assistant (PDA)), a workstation, a minicomputer, a server, a mainframe, and a supercomputer. The machine 100 may include various devices such as embedded controllers, Programmable Logic Devices (PLDs) (e.g., PROM (Programmable Read Only Memory), PLA (Programmable Logic Array), GAL/PAL (Generic Array Logic/Programmable Array Logic)), Field Programmable Gate Arrays (FPGAs), Application Specific Integrated Circuits (ASICs), single-chip computers, smart cards, and the like.

Machine instructions (also known as programs, software, software applications or code) may be stored in the machine 100 or delivered to the machine 100 over a communication interface. As used herein, the term "machine-readable material" refers to any machine-readable medium or device used to provide machine instructions and/or data to the machine 100. Examples of a machine-readable medium include the medium 135 and the like. Examples of a machine-readable device include the non-volatile memory 120, and/or PLDs, FPGAs, ASICs, and the like. The term "machine-readable signal" refers to any signal, such as the signals 154, used to provide machine instructions and/or data to the machine 100.

Other systems, architectures, and modifications and/or reconfigurations of machine 100 of FIG. 1 are also possible.

Figure 2A:
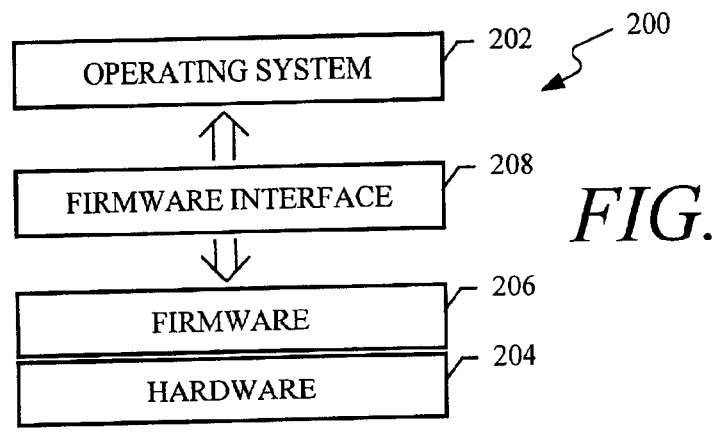
FIGS. 2A, 2B and 2C are block diagrams illustrating a system firmware interface specification that may be used with the example data processing system of FIG. 1 to provide a legacy-free environment.
Figure 2B:
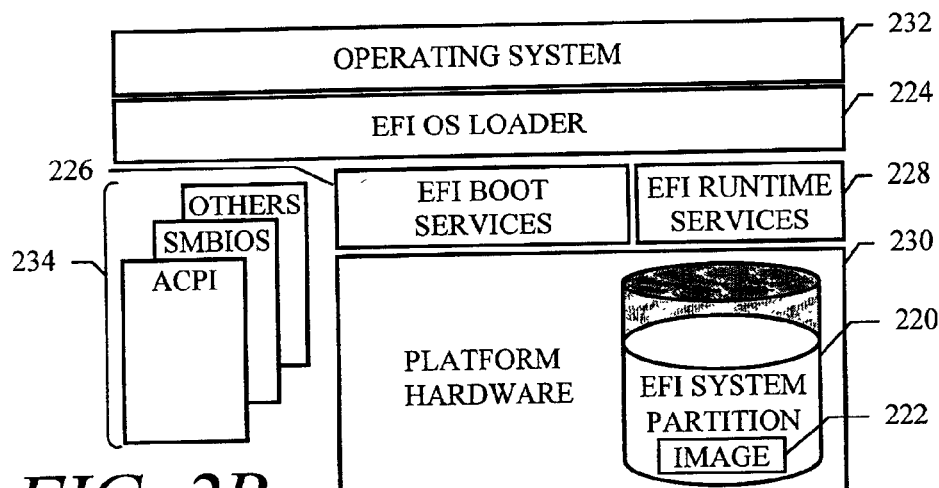
Figure 2C:
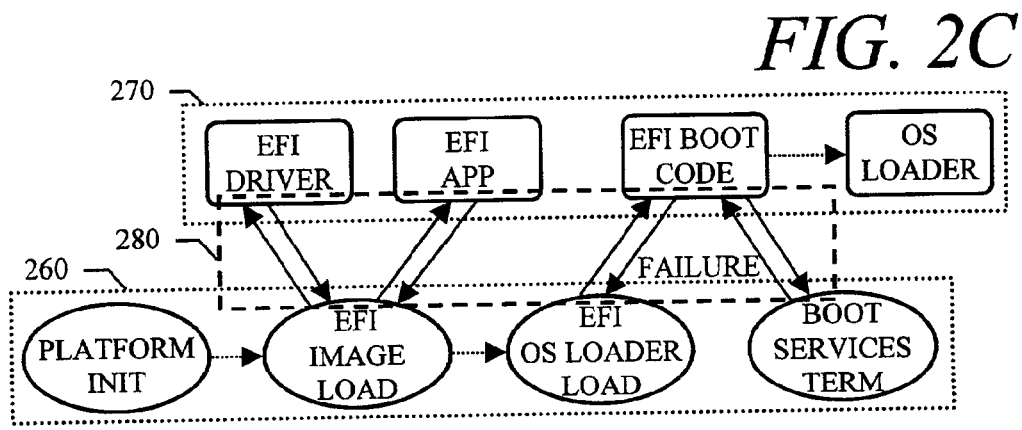

FIGS. 2A, 2B and 2C are block diagrams illustrating a system firmware interface specification that may be used with the example data processing system of FIG. 1 to provide a legacy-free environment. As shown in FIG. 2A, a system 200 includes an OS 202, hardware 204 and firmware 206. A firmware interface specification 208 describes an interface between the OS 202 and the firmware 206. The interface 208 provides a standard interface that is not dependent on historic APIs (i.e., the interface 208 provides a legacy-free environment).

For example, the interface 208 may be in the form of data tables that contain platform-related information, and boot and runtime service calls that are available to the OS 202 and its loader. An example of the interface 208 is the Extensible Firmware Interface (EFI) architecture specification developed by Intel Corporation, located at 2080 Mission College Boulevard, Santa Clara Calif., 95052-8119. The EFI specification defines a set of interfaces and structures that platform firmware implements and that the OS may use in booting. The actual implementation of the firmware elements and how an OS uses the interfaces and structures is left undefined by EFI.

This is accomplished in EFI through a formal and complete abstract specification of the software-visible interface presented to the OS by the hardware and firmware. The EFI specification may be used with many data processing systems, including the next generation of IA-32 and Itanium™-based computers and data processing systems. The EFI specification provides a core set of services along with a selection of evolvable protocol interfaces to define an evolutionary path from the traditional style boot (e.g., a PC platform that uses the AT (advanced technologies) form factor for their motherboards) into a legacy-API free environment.

FIG. 2B is a block diagram illustrating relationships of various components of an EFI specification-compliant system that are used to accomplish platform and OS boot. The system includes platform hardware 230 and an OS 232. The platform firmware may retrieve an OS loader image 222 from an EFI System Partition 220 using an EFI OS loader 224.

The EFI System Partition 220 may be an architecturally shareable system partition. As such, the EFI System Partition 220 defines a partition and file system that are designed to allow safe sharing of mass storage between multiple vendors, including sharing for different purposes. The EFI specification defines persistent store on large mass storage media types for use by platform support code extensions to supplement the traditional approach of embedding code in the platform during manufacturing (e.g., in flash memory devices).

For example, a block input/output (I/O) protocol may be defined for use during boot services to abstract mass storage devices, thereby allowing boot services code to perform block I/O without knowing the type of a device or its controller. A variety of mass storage device types may be supported, including magnetic disks (e.g., floppy disk, hard disk) and optical disks (e.g., CD and DVD), as well as mass storage via a communication channel (i.e., remote boot via a network).

Once started, an OS loader continues to boot the complete OS 232, and in so doing, may use EFI boot services 226 and interfaces or other specifications to survey, comprehend and initialize the various platform components and the OS software that manages them. Thus, interfaces 234 from other specifications may also be present on the platform. For example, the Advanced Configuration and Power Interface (ACPI) (see acpi-info/index-html) and the System Management BIOS (SMBIOS) (see developer-intel-com/ial/WfM/design/BIBLIOG.HTM) from the Wired for Management (WfM) specification may be supported. Please note that Uniform Resource Locators (URLs) have been modified to omit the "http//" prefixes, as well as replace periods with dashes, to avoid being automatically converted into hyperlinks.

The EFI boot services 226 provide interfaces for devices and system functionality that can be used during boot time. Device access is abstracted through "handles" and "protocols." EFI runtime services 228 may also be available to the OS loader during the boot phase. For example, a minimal set of runtime services may be presented to ensure appropriate abstraction of base platform hardware resources that may be needed by the OS 232 during its normal operations.

The Extensible Firmware Interface allows extension of platform firmware by loading EFI driver and EFI application images, which when loaded, have access to all EFI defined runtime and boot services. FIG. 2C is a block diagram illustrating a booting sequence for an EFI specification-compliant system. A boot manager 260 starts with a standard firmware platform initialization. Next, EFI drivers and applications are loaded iteratively from EFI binaries 270.

Then, the boot manager boots from an ordered list of EFI OS loaders using EFI boot code. If a failure occurs, a second boot option is selected, and so on. Once an EFI OS loader loads enough of its own environment to take control of the system's continued operation, boot services terminate.

EFI allows consolidation of boot menus from the OS loader and platform firmware into a single platform firmware menu. These platform firmware menus allow the selection of any EFI OS loader from any partition on any boot medium that is supported by EFI boot services. An EFI OS loader can support multiple options that can appear on the user interface. It is also possible to include legacy boot options, such as booting from the A: or C: drive in the platform firmware boot menus.

EFI supports booting from media that contain an EFI OS loader or an EFI-defined System Partition. An EFI-defined System Partition may be required by EFI to boot from a block device. EFI does not require any change to the first sector of a partition, so it is possible to build media that will boot on both legacy architectures (e.g., IA-PC) and EFI platforms.

The dashed arrows in FIG. 2C represent implementation aspects left undefined by the Extensible Firmware Interface. An EFI API 280 defines the interface between the boot manager 260 and the EFI binaries 270.

Version 1.02 of the EFI specification is available at http://developer-intel-com/technology/efi/main_specification.htm. Version 1.02 of the EFI specification is included in the technical appendix incorporated by reference herein.

Figure 3:
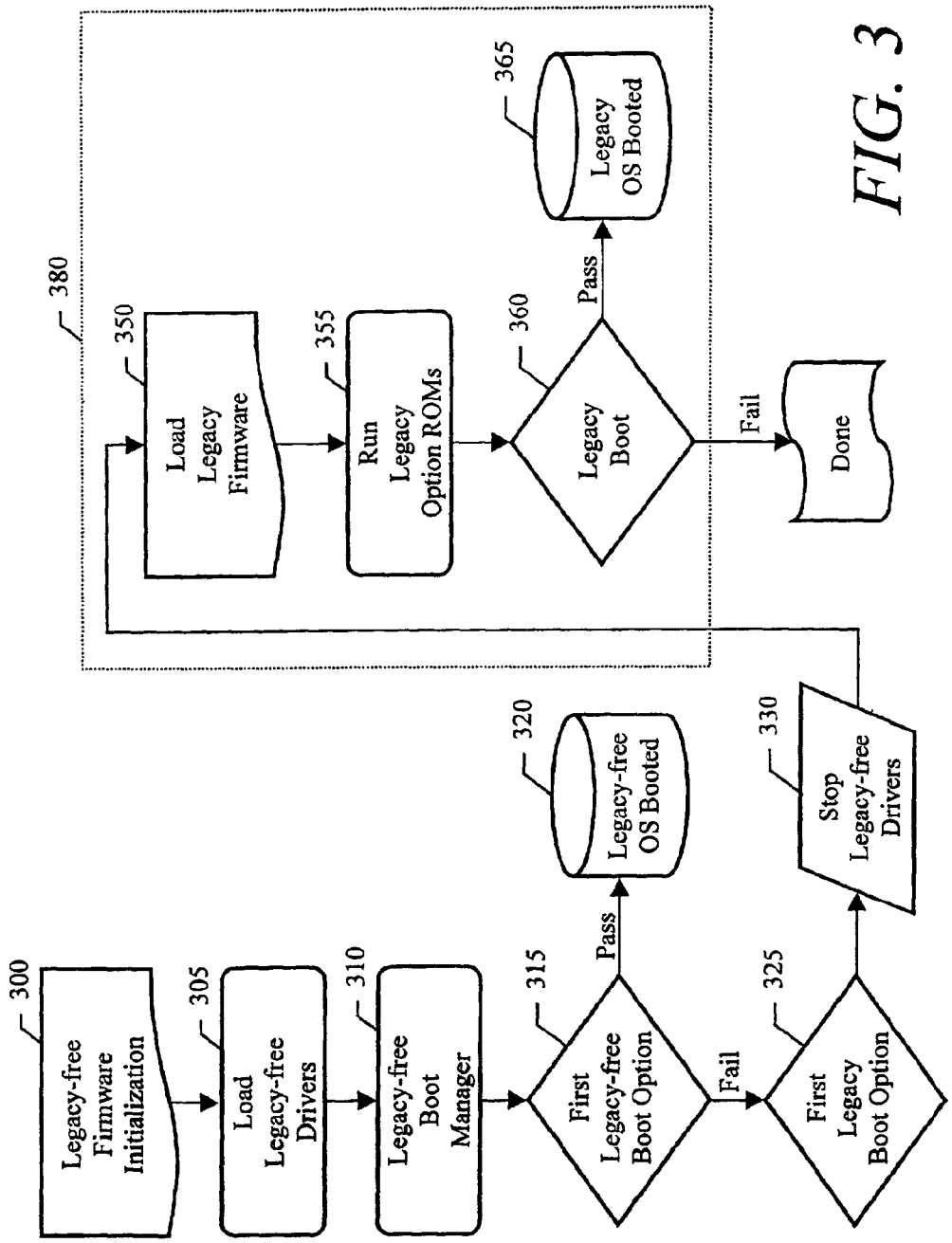
FIG. 3 is a logic flow diagram illustrating a boot sequence that supports a legacy operating system in a legacy-free system.

FIG. 3 is a logic flow diagram illustrating a boot sequence that supports a legacy operating system in a legacy-free system. The legacy-free system used in FIG. 3 may be an EFI system, such as described above. The boot sequence begins with legacy-free firmware initialization (300).

The legacy-free firmware provides a legacy-free boot path from system power up to operating system loading. This legacy-free boot path is independent of any legacy firmware. Thus, unlike the first generation of EFI systems, this legacy-free booting does not use any legacy BIOS.

Following initialization, legacy-free drivers are loaded (305). A legacy-free boot manager boots from an ordered list of OS loaders (310). The boot manager may begin with one or more legacy-free boot options (315). If one or more of these legacy-free boot options passes, a corresponding legacy-free OS is booted (320).

If all of the legacy-free boot options fail (e.g., if the system includes a legacy option ROM, such as may be found in plug-in PCI cards, which causes failure of legacy-free booting), one or more legacy boot options are considered (325). If one of these legacy boot options is available, the legacy-free drivers that have already been loaded are stopped (330).

Alternatively, the one or more legacy boot options are considered before the one or more legacy-free boot options. Thus, the optional termination of legacy-free drivers may occur before the one or more legacy-free boot options are considered. The OS boot order may be a configuration option for the legacy-free boot manager.

The optional termination of the legacy-free drivers allows initiation of a legacy boot using legacy firmware without having to reboot the system. Thus, legacy firmware is supported without intermixing a legacy boot path with a legacy-free boot path. For example, in the case of EFI, the next generation of EFI defines an EFI option ROM standard that is intended to replace legacy option ROMS, which may present a problem for a system that supports booting both legacy operating systems and EFI operating systems.

There may be difficulties in determining which option ROM is to run. The legacy option ROM could be used in EFI, but this is likely to require support infrastructure, while simultaneously being less feature rich than a native EFI option ROM. By separating the legacy-free boot path from the legacy boot path, a legacy OS boot is supported in a legacy-free system, but the legacy OS boot may be phased out over time. The legacy firmware and the legacy-free drivers are not connected, thus they can evolve independently of each other. The legacy option ROMs are either part of a plug-in device or part of a legacy platform.

Once the legacy-free drivers are stopped, the legacy firmware is loaded (350). Stopping the legacy-free drivers and transitioning to the legacy firmware may be implemented in various ways, depending in part upon the type of system (e.g., laptop, desktop, workstation, etc.). Regardless, the legacy firmware is only used to support legacy OS booting and is not used as a layer underlying a legacy-free API supporting legacy-free OS booting (i.e., the legacy-free API is not just a wrapper on top of legacy firmware).

Next, legacy option ROMs are run (355). Then, if the legacy boot has succeeded (360), the legacy OS is booted (365).

Thus, the legacy firmware and legacy option ROMs are effectively encapsulated in a legacy boot path 380. The legacy environment and the legacy-free environment are thus bound together such that they do not conflict with each other, while the inherent limitations of the legacy environment are contained in the legacy boot path 380 and may be phased out over time.

The various implementations described above have been presented by way of example only, and not limitation. Other embodiments may be within the scope of the following claims.

What is claimed is:

1. A system comprising:
    a central processor;
    a machine-readable device coupled with the central processor, the machine-readable device storing legacy firmware; and
    non-volatile memory coupled with the central processor, the non-volatile memory storing legacy-free firmware providing a legacy-free boot path from system power up to operating system loading that is independent of the legacy firmware, wherein the legacy-free firmware includes an optional termination of legacy-free drivers and initiation of a legacy boot using the legacy firmware.

2. The system of claim 1, wherein the non-volatile memory comprises random access non-volatile memory.

3. The system of claim 1, wherein the machine-readable device comprises an option read only memory in a plug-in peripheral component interconnect card.

4. The system of claim 1, wherein the machine-readable device comprises an option read only memory in the non-volatile memory.

5. The system of claim 1, wherein the central processor comprises a central processing unit housed in a single chip.

6. The system of claim 5, further comprising:
    a volatile memory; and
    a motherboard coupling the volatile memory, the non-volatile memory and the machine-readable device with the central processing unit.

7. A machine-readable material embodying information indicative of instructions for causing a machine to perform operations comprising:
    loading a legacy-free driver during an initial boot process using legacy-free firmware;
    checking a legacy boot option;
    stopping the legacy-free driver; and
    loading legacy firmware.

8. The machine-readable material of claim 7, further comprising running the legacy firmware.

9. The machine-readable material of claim 8, wherein the legacy firmware comes from a legacy option read only memory in a plug-in peripheral component interconnect card.

10. The machine-readable material of claim 9, wherein the legacy-free driver comprises an Extensible Firmware Interface driver, and the legacy-free firmware comprises Extensible Firmware Interface firmware.

11. A machine-implemented method for supporting legacy operating system booting in a legacy-free system, the method comprising:

loading a legacy-free driver during an initial boot process using legacy-free firmware;

checking a legacy boot option;

stopping the legacy-free driver; and loading legacy firmware.

12. The machine-implemented method of claim 11, further comprising running the legacy firmware.

13. The machine-implemented method of claim 12, wherein the legacy firmware comes from a legacy option read only memory in a plug-in peripheral component interconnect card.

14. The machine-implemented method of claim 13, wherein the legacy-free driver comprises an Extensible Firmware Interface driver, and the legacy-free firmware comprises Extensible Firmware Interface firmware.

15. A data processing system comprising:

means for processing instructions and data; and means for separating a legacy-free boot path from a legacy boot path such that the legacy boot path comprises an encapsulated boot process, wherein the legacy-free boot path is provided from system power up to operating system loading that is independent of legacy firmware, and wherein legacy-free firmware includes an optional termination of legacy-free drivers and initiation of a legacy boot using the legacy firmware.

16. The system of claim 15, wherein the legacy boot path comprises legacy firmware from a legacy option read only memory.

17. The system of claim 16, wherein the legacy option read only memory comprises a part of a plug-in device.

18. The system of claim 16, wherein the legacy option read only memory comprises a part of a legacy platform.

* * * * *